US009649693B2

(12) United States Patent
Friedl et al.

(10) Patent No.: US 9,649,693 B2
(45) Date of Patent: May 16, 2017

(54) CUTTING INSERT

(75) Inventors: Roland Friedl, Weissenbach (AT); Hannes Spielmann, Ehrwald (AT)

(73) Assignee: Ceratizit Austria Gesellschaft M.B.H., Reutte (AT)

( * ) Notice: Subject to any disclaimer, the term of this patent is extended or adjusted under 35 U.S.C. 154(b) by 629 days.

(21) Appl. No.: 14/003,939

(22) PCT Filed: Mar. 8, 2012

(86) PCT No.: PCT/AT2012/000055
§ 371 (c)(1),
(2), (4) Date: Sep. 9, 2013

(87) PCT Pub. No.: WO2012/119168
PCT Pub. Date: Sep. 13, 2012

(65) Prior Publication Data
US 2014/0000423 A1 Jan. 2, 2014

(30) Foreign Application Priority Data
Mar. 9, 2011 (AT) ................................ GM131/2011

(51) Int. Cl.
*B23B 27/16* (2006.01)
*B23B 27/04* (2006.01)
(Continued)

(52) U.S. Cl.
CPC ............ *B23B 27/1611* (2013.01); *B23B 1/00* (2013.01); *B23B 27/045* (2013.01);
(Continued)

(58) Field of Classification Search
CPC ...... B23B 2200/0423; B23B 2200/085; B23B 2200/0404; B23B 27/141; B23B 27/1611; B23B 2200/204
See application file for complete search history.

(56) References Cited

U.S. PATENT DOCUMENTS 4,123,194 A * 10/1978 Cave ..................... B23B 27/065
407/6
4,552,492 A * 11/1985 Komanduri ........... B23B 27/145
407/114

(Continued)

FOREIGN PATENT DOCUMENTS

CN 1131597 A 9/1996
CN 1452528 A 10/2003
(Continued)

*Primary Examiner* — Sara Addisu
(74) *Attorney, Agent, or Firm* — Laurence A. Greenberg; Werner H. Stemer; Ralph E. Locher

(57) ABSTRACT

A cutting insert has a bottom supporting surface, a center cutting edge, two secondary cutting edges, realized on both sides of the center cutting edge and offset in relation to the center cutting edge, and two transition edges connecting the center cutting edge to the secondary cutting edge adjacent in each case. The two secondary cutting edges are realized in each case vertically offset and, where applicable, also offset in depth with respect to the center cutting edge and are laterally spaced from the center cutting edge. The transition edges, in each case in a non-edge-overlapping region, have at least over a portion an inclination n where 2°≤n≤20° in relation to a height direction which extends at right angles with respect to a main extension plane of the supporting surface.

17 Claims, 3 Drawing Sheets

(51) Int. Cl.
*B23B 27/14* (2006.01)
*B23B 1/00* (2006.01)

(52) U.S. Cl.
CPC ........ *B23B 27/141* (2013.01); *B23B 27/1607* (2013.01); *B23B 2200/0404* (2013.01); *B23B 2200/0423* (2013.01); *B23B 2200/085* (2013.01); *B23B 2200/204* (2013.01); *Y10T 82/10* (2015.01); *Y10T 407/23* (2015.01); *Y10T 407/235* (2015.01)

(56) References Cited

U.S. PATENT DOCUMENTS

| | | | | |
|---|---|---|---|---|
| 4,648,760 | A * | 3/1987 | Karlsson | B23B 27/141 407/113 |
| 5,059,069 | A * | 10/1991 | Lagerberg | B23B 27/065 407/113 |
| 5,137,396 | A | 8/1992 | Duerschinger | |
| 5,203,648 | A * | 4/1993 | Bohannan | B23B 27/045 407/113 |
| 5,688,083 | A | 11/1997 | Boianjiu | |
| 5,709,509 | A * | 1/1998 | Wegener | B23C 5/2213 407/114 |
| 5,758,994 | A * | 6/1998 | Hintze | B23B 27/141 407/113 |
| 5,827,017 | A * | 10/1998 | Tagstrom | B23B 27/045 407/114 |
| 5,975,812 | A | 11/1999 | Friedman | |
| 6,099,209 | A * | 8/2000 | Murray | B23B 27/145 407/1 |
| 6,196,770 | B1 * | 3/2001 | Astrom | B23C 5/109 407/114 |
| 6,224,300 | B1 | 5/2001 | Baxivanelis et al. | |
| 6,238,146 | B1 * | 5/2001 | Satran | B23B 27/1614 407/113 |
| 6,341,923 | B1 * | 1/2002 | Niemi | B23B 27/065 407/113 |
| 6,428,247 | B1 | 8/2002 | Friedman | |
| 6,733,215 | B2 | 5/2004 | Isaksson | |
| 6,843,620 | B2 * | 1/2005 | Inayama | B23B 27/045 407/100 |
| 6,935,814 | B2 * | 8/2005 | Nagaya | B23C 5/207 407/100 |
| 7,150,215 | B2 * | 12/2006 | Krehel | B23D 61/06 83/835 |
| 7,281,884 | B2 * | 10/2007 | Maeda | B23C 5/109 407/113 |
| 7,665,933 | B2 | 2/2010 | Nagaya et al. | |
| 7,739,931 | B2 * | 6/2010 | van Asten | B23B 27/145 407/113 |
| 7,905,688 | B2 * | 3/2011 | Ertl | B23C 5/10 407/113 |
| 8,096,734 | B2 * | 1/2012 | Sjoo | B23F 21/163 407/23 |
| 8,113,746 | B2 * | 2/2012 | Koga | B23C 5/06 407/113 |
| 8,137,034 | B2 | 3/2012 | Noureddine | |
| 8,475,089 | B2 * | 7/2013 | Kakai | B23C 5/109 407/103 |
| 8,529,164 | B2 * | 9/2013 | Degany | B23C 5/207 407/118 |
| 8,696,263 | B2 * | 4/2014 | Saji | B23C 5/109 407/113 |
| 2001/0014259 | A1 * | 8/2001 | Inayama | B23B 27/045 407/116 |
| 2003/0113175 | A1 * | 6/2003 | Wermeister | B23C 3/08 407/113 |
| 2003/0215294 | A1 * | 11/2003 | Wermeister | B23C 5/08 407/113 |
| 2004/0240949 | A1 * | 12/2004 | Pachao-Morbitzer | B23B 27/065 407/11 |
| 2005/0111928 | A1 * | 5/2005 | Stanarius | B23C 5/207 409/132 |
| 2006/0045634 | A1 * | 3/2006 | Koskinen | B23B 5/166 407/40 |
| 2006/0263153 | A1 * | 11/2006 | Isaksson | B23B 27/065 407/113 |
| 2007/0034063 | A1 * | 2/2007 | Wurfels | B23B 27/1618 83/74 |
| 2008/0240875 | A1 | 10/2008 | Nagaya et al. | |
| 2010/0272525 | A1 * | 10/2010 | Corbin | B23B 27/141 407/113 |
| 2012/0201622 | A1 * | 8/2012 | Kocherovsky | B23B 29/02 409/131 |
| 2013/0315684 | A1 * | 11/2013 | Ramesh | B23B 27/145 408/231 |
| 2014/0161552 | A1 * | 6/2014 | Ramesh | B23B 51/048 408/231 |

FOREIGN PATENT DOCUMENTS

| | | |
|---|---|---|
| CN | 101274372 A | 10/2008 |
| DE | 29804257 U1 | 5/1998 |
| DE | 19720022 A1 | 11/1998 |
| EP | 0454824 | 11/1991 |
| EP | 1980348 A2 | 10/2008 |
| WO | 9108071 A1 | 6/1991 |
| WO | 2007095656 A1 | 8/2007 |
| WO | 2008014934 A1 | 2/2008 |

* cited by examiner

CUTTING INSERT

The present invention relates to a cutting insert for a cutting tool for machining a workpiece.

BACKGROUND OF THE INVENTION

Field of the Invention

Cutting inserts for cutting tools for machining a workpiece are used in particular for machining metal workpieces by means of turning. During turning, the workpiece to be processed is turned and the fixedly clamped cutting insert is moved (in all directions) on the turning workpiece in order to remove a chip. During groove turning, grooves are introduced into the rotating workpiece by means of the cutting insert. In this case, the groove in the lateral surface of the rotating workpiece can be effected in the radial direction, which can be realized by feeding the cutting insert in the radial direction (radial groove turning). In addition, the groove into the end face of the rotating workpiece can be effected in the axial direction, which can be realized by feeding the cutting insert in the axial direction (axial groove turning). Grooves are also possible obliquely with respect to the axial direction (i.e. in the region between the axial and radial direction) (copying). High cutting forces are generated in particular in the area of heavy machine cutting where there are large and heavy workpieces as well as high-speed feeds. In this case, comparatively large average chip thicknesses are also generated.

Generally speaking, the requirement for cutting inserts is that in spite of the high forces occurring they provide precise processing of the workpiece and good chip formation as well as have long tool lives. Said requirements exist in particular in the case of cutting inserts which are realized for groove turning and especially in the area of heavy machine cutting.

The publication DE 298 04 257 U1 makes known a cutting insert which has a front cutting edge which has at least two cutting edge portions. In this case, each of the two adjacent cutting edge portions is connected together by a common transition portion, the adjacent cutting edge portions overlapping in each case. A chip separating device is formed in this manner.

BRIEF SUMMARY OF THE INVENTION

The object of the present invention is to provide a cutting insert which, in use, provides precise processing of a workpiece to be processed and good chip formation and which, in addition, has a long service life and process reliability.

The object is achieved by a cutting insert as claimed as well as by a method as claimed. Advantageous further developments of the invention are provided in the subclaims.

As claimed in the present invention, there is provided a cutting insert which has a bottom supporting surface, a center cutting edge, two secondary cutting edges which are realized on both sides of the center cutting edge and are offset in relation to the center cutting edge and two transition edges which connect the center cutting edge to the secondary cutting edge adjacent in each case. At the same time the two secondary cutting edges are realized in each case vertically offset and, where applicable, also offset in depth with respect to the center cutting edge and are laterally spaced from the center cutting edge. The transition edges, in each case in a non-edge-overlapping region, have at least over a portion an inclination n where $2° \leq n \leq 20°$ in relation to a height direction which extends at right angles with respect to a main extension plane of the supporting surface.

By the center cutting edge and the two secondary cutting edges being arranged offset with respect to one another, chip separation occurs in use. In particular, the number of chips obtained is the number of cutting edges provided realized offset with respect to one another. If just the center cutting edge and the two secondary cutting edges are provided, three chips will be obtained in use. Such chip separating is advantageous with regard to good chip formation and good removal of the formed chips.

One edge on a cutting insert, which is realized for groove turning, then forms a cutting edge and in use cuts into the turning or rotating workpiece smoothly and forming chips when said edge extends at right angles to the direction of movement of the material of the workpiece in the contact region of the edge with the workpiece, (ideal cutting alignment) or is inclined only slightly with respect to said ideal cutting alignment. The more an edge of a cutting insert is inclined in relation to such an ideal cutting alignment, the less it cuts into the material of the workpiece. This applies, in particular, when the edge is inclined in such a manner that it extends in use in the contact region of the edge with the workpiece to a considerable extent parallel to the direction of movement of the material of the workpiece. Up to now the generally prevailing opinion in the specialist field has been that whenever several cutting edges, which are realized offset with respect to one another, are to be provided on a cutting insert, said cutting edges must overlap with one another or must be realized at least connecting directly together. Correspondingly, according to said prevailing opinion, the transition region between the cutting edges is to be realized in such a manner that with reference to a projection onto the workpiece to be processed (or also correspondingly with reference to a projection onto a supporting surface of the cutting insert) the cutting edges overlap or are realized at least connecting directly together. This is obtained, for example, by an S-shaped transition region. It is ensured in this manner that the material of the workpiece is smoothly incised and the chips are removed by means of the cutting edges over the entire edge development of the cutting edges.

Accordingly, as claimed in the present invention, the two transition edges have at least one portion which is inclined only relatively slightly ($2° \leq n \leq 20°$) in relation to the height direction and correspondingly in use in the contact region of the transition edge with the workpiece is inclined only relatively slightly compared to the direction of movement of the material of the workpiece (it being possible for the actual inclination in use to vary slightly in dependence on a cutting edge set angle which is set at the workpiece holder). As a result of the arrangement of the center cutting edge and of the secondary cutting edges as claimed in the invention and as a result of the design of said portion in a non-edge-overlapping region, said portion in use moves into engagement with the material of the workpiece to be processed. Correspondingly, the cutting insert as claimed in the invention is not realized in a continuously cutting manner. Rather, at least one "non-cutting portion" is provided in each case between the center cutting edge and the two secondary cutting edges. It has been shown that nevertheless even in said "non-cutting portion" material of the workpiece to be processed is removed. Said material, however, is not incised smoothly, as is the case where an edge is in an ideal cutting alignment, but rather is removed from the turning workpiece by means of forces which occur in the region of the "non-cutting portion". High shear forces occur in particular in said region. As a result, the chips formed on the center cutting edge as well as on the secondary cutting edges have in each case laterally sheared-off material as well as resultant lateral tears (i.e. edge defects) on their lateral edge region (or on both lateral edge regions) which has been separated off on the "non-cutting portion" of the relevant transition edge. As a result chip breaking is supported, which once again is advantageous with regard to the removal of the chips created.

In addition, it has been shown in a surprising manner that in the case of the cutting insert as claimed in the invention, positional stabilization of the cutting insert in use in relation to the turning workpiece is obtained by providing at least two "non-cutting portions". This is traced back to the fact that high forces are set against the material of the workpiece turning past the region of the "non-cutting portions" of the transition edges, and, as a result, lateral guiding is provided between the cutting insert and the turning workpiece. With regard to positional stability, it is advantageous, in particular, in this case, for the forces which occur on the two transition edges to act against one another in the lateral direction and preferably also to be symmetrical with respect to one another. In addition, it is advantageous for the edge regions of the different cutting edges to be sturdy and dimensionally stable by the adjacent cutting edge or edges in each case being laterally spaced. The risk of a material ridge in the edge region of the cutting edges and of the chip faces connecting thereto, as exists, for example, in the case of overlapping cutting edges or cutting edges which connect directly to one another, is considerably reduced as a result. Over and above this, the cutting insert as claimed in the invention is distinguished in that it can be produced in a cost-efficient manner. In particular, it can be produced simply by means of pressing without further forming processing steps being necessary. In particular, the cutting insert is produced in a powder metallurgical manner by pressing corresponding powders and by subsequently sintering the same. Hard metals are used in particular as materials for the cutting insert.

The cutting insert as claimed in the invention is realized in particular for groove turning. In particular it forms a groove plate for groove turning. As claimed in an advantageous further development, the cutting insert is formed by a heavy machine cutting groove plate. The bottom supporting surface serves for supporting the cutting insert on a corresponding face of a receiving means of a tool holder. Defined positioning of the cutting insert in relation to the tool holder is also ensured, as a rule, by means of the bottom supporting surface (and as a rule by means of at least one further side face of the cutting insert). The bottom supporting surface can be formed by precisely one even face. However, the bottom supporting surface can also have a curved development and/or several parts faces which are inclined in relation to one another. For example, the bottom supporting surface can be formed by two part faces which are inclined toward one another and are arranged in the shape of a roof. In addition, bottom supporting surfaces which have an undulating structure, for example, are also possible. If the bottom supporting surface is formed by precisely one even face, said face at the same time forms the main extension plane of the supporting surface. Otherwise the main extension plane is determined in such a manner that the supporting surface is approximated by a plane. In particular for said approximation the amount of the spacing between the supporting surface and the relevant approximation plane is integrated over the entire supporting surface, the spacing in each case being measured at right angles to the approximation plane.

The approximation plane, for which the integral is minimal, forms the main extension plane of the supporting surface. The main extension plane of the bottom supporting surface is used in the present case as a reference plane for the different direction designations: the height direction runs at right angles to the main extension plane of the supporting surface. The lateral direction and the depth direction run parallel to the main extension plane of the supporting surface. In this case, the lateral direction runs in particular parallel to a main extension direction of the center cutting edge. This applies to the preferred case of the main extension direction of the center cutting edge running parallel to the main extension plane of the supporting surface. Where the main extension direction of the center cutting edge extends inclinedly with respect to the main extension plane of the supporting surface, the center cutting edge is initially projected onto the main extension plane of the supporting surface and then the main extension direction of the projected center cutting edge is used as the lateral direction. If the center cutting edge has a curved development, the development thereof (where applicable after projection of the center cutting edge onto the main extension plane of the supporting surface) is approximated by a straight line, said straight line then forming the main extension direction. The depth direction is in particular at right angles to the lateral direction (and the height direction).

As claimed in the present invention, the cutting insert has as cutting edges at least the center cutting edge and on both sides thereof the two secondary cutting edges. In this case, the cutting insert can also have still further cutting edges and/or transition edges on the relevant cutting edge. For example, said cutting edges or transition edges can connect to the two secondary cutting edges on both sides and laterally. The edges (cutting edges and/or transition edges), in this case, can be rounded over their entire development or also just in portions, as is known in the specialist field, and/or can be provided with a phase. A "non-edge-overlapping" region refers to the fact that the relevant edges (cutting edges and transition edges, in particular the center cutting edge, the two secondary cutting edges and the two transition edges) do not overlap in said region with reference to any view direction which extends at right angles to the lateral direction. In the present case this means that the relevant portion of the transition edge (with the relatively small inclination in relation to the height direction) moves in use into engagement with the material of the workpiece independently of the set angle of the cutting edge of the cutting insert.

As claimed in a further development, the transition edges, in each case in a non-edge-overlapping region, have at least over a portion an inclination n where $5° \leq n \leq 15°$ in relation to the height direction. The advantages explained above with reference to the further angular range have been obtained to a greater extent within said narrower angular range. In this case, it must be considered both with reference to the further angular range of $2° \leq n \leq 20°$ and with reference to the narrower angular range of $5° \leq n \leq 15°$ that an inclination within the respective angular range, in the case of a rectilinear development of the transition edge in said portion, means that the inclination thereof (remaining constant over the portion) lies within the respective angular range. Where the transition edge is developed in a curved manner in said portion, this means that said transition edge has an inclination (within said portion) at every point which lies within the respective angular range. The portion, in which the inclination n of the transition edge lies within the respective angular range, extends in particular along the lateral direction over at least 0.04 mm, in particular over at least 0.13 mm.

As claimed in a further development, the edge development of the center cutting edge, of the two transition edges and of the two secondary cutting edges is substantially mirror-symmetrical in relation to a plane of symmetry which extends parallel to the height direction and at right angles to a main extension direction of the center cutting edge. Such symmetry has an advantageous effect with reference to the process stability, in particular with reference to positional stabilizing of the cutting insert in relation to the turning workpiece. For through such symmetry, the forces occurring in use, in particular in the preferred case where the workpiece surface to be processed is aligned at right angles to the plane of symmetry of the cutting insert, are also substantially symmetrical to the plane of symmetry. As claimed in a further development, the face development of the rake faces or faces (center rake face, transition faces and secondary rake faces) connecting to said cutting edges or edges (center cutting edge, transition edges and secondary cutting edges) in the depth direction is/are also realized substantially symmetrically to the plane of symmetry. In a corresponding manner, the flank faces (center flank face, transition flank faces and secondary flank faces) connecting in the height direction to said cutting edges or edges (center cutting edge, transition edges and secondary cutting edges) are preferably also realized substantially symmetrically to the plane of symmetry. By means of said substantially symmetrical realization of the rake faces, faces and/or flank faces, the process stability of the cutting insert and in particular the above-explained effects with reference to positional stabilizing are increased further. As claimed in a further development, the entire cutting insert is substantially mirror-symmetrical with respect to the plane of symmetry. In this case, it is basically sufficient that, in the case of the above-mentioned symmetries, a substantially symmetrical design is present, since, as is known in the specialist field, the above-mentioned advantages can still be obtained even in the case of slight deviations from the named symmetries. In each case, a precisely symmetrical design is present in particular in the case of the above-named further developments and variants.

Generally speaking, in the case of the different features explained in conjunction with the edge development (of the center cutting edge, of the transition edges and of the secondary cutting edges) it is preferred that at least in the region connecting to the edges in the depth direction, the respective faces (center rake face, transition faces and secondary rake faces) are adapted extensively in their development to the development of the edges (center cutting edge, transition edges and secondary cutting edges). Correspondingly, the features mentioned with reference to the development of the edges as claimed in advantageous further developments are also applicable in a corresponding manner with reference to the development of the faces connecting thereto in the depth direction, even when no explicit reference thereto is made each time. As an alternative to this, it is possible for the development of the faces connecting to the edges in the depth direction also to change. In particular, the height difference between the center rake face and the secondary rake faces in the depth direction can also increase or decrease. In addition, it is also possible for the faces connecting to the edges in the depth direction (center rake face, transition faces and secondary rake faces) to have ribs, knobs, other surface structuring and/or a curved development.

As claimed in a further development, the edge development of the center cutting edge, of the two transition edges and of the two secondary cutting edges is realized so as to be continuously non-edge-overlapping. As a result, a sturdy and solid realization of the edge regions of the cutting edges is obtained such that the risk of a material ridge in said regions is reduced. As claimed in a further development, the face development of the center rake face connecting thereto, of the transition faces and of the secondary rake faces is also realized so as to be non-overlapping. This is also advantageous with regard to avoiding a material ridge.

As claimed in a further development, the transitions between the center cutting edge and the transition edges and/or the transitions between the transition edges and the secondary cutting edges have in each case a radius of curvature of 0.3 mm. In particular it is preferred that at least the curvature radii between the cutting edge or cutting edges protruding further forward (which, in principle, can be formed by the two secondary cutting edges or as an alternative by the centre cutting edge) and the transition edges adjoining in each case are ≤0.3 mm. By means of such a relatively small radius of curvature, the chip is effectively incised in said region along the chip forming direction, which is advantageous with regard to chip separating. In particular, the radius of curvature r in each case is within a range of from $0.1 \text{ mm} \leq r \leq 0.3 \text{ mm}$. As claimed in a further development, the respective edges extend linearly into the transitions between the center cutting edge and the transition edges and/or into the transitions between the transition edges and the secondary cutting edges, in particular at an inclination within the angular ranges specified above. In this case, a radius of curvature, as defined above, can be provided in each case at the transition itself. As claimed in a further development, said specified ranges of the radii of curvature and the developments also apply to the radii of curvature and developments of the transitions between the center rake face and the transition faces and/or between the transition faces and the secondary take faces. In this case, the radius of curvature with reference to said faces is measured in each case in a cross section which is aligned parallel to the height and lateral direction.

As claimed in a further development, the center cutting edge protrudes further forward in relation to the supporting surface (with reference to the height direction and where applicable also with reference to the depth direction) than the two secondary cutting edges. Correspondingly, in the case of said further development the center rake face also protrudes further forward than the secondary rake faces. This is advantageous with regard to the positional stabilizing of the cutting insert in relation to the workpiece.

As claimed in a further development, the offset between the two secondary cutting edges and the center cutting edge is formed in each case to be at least 80% along the height direction. Correspondingly, the offset extends to a maximum of 20% along the depth direction. Said specifications are applicable with reference to a projection of the offset along the height direction and along the depth direction. As claimed in a further development, the offset extends completely along the height direction. The higher the proportion of the offset along the depth direction, the more pronounced a profile formation is obtained on the workpiece to be processed, proceeding from no cutting edge set angle or only a small cutting edge set angle in relation to the workpiece. In this case, the angle at which the main extension plane of the supporting surface of the cutting insert is tilted in use (in the case of a feed in the horizontal direction) in relation to a horizontal plane parallel to the center cutting edge (or to the main extension direction thereof) is designated as the cutting edge set angle. By the offset in the case of the present further development extending predominantly or completely along the height direction, it is additionally achieved that the transition edge extends completely or at least in portions extensively parallel to the direction of movement of the material of the workpiece in the contact region of the transition edge with the workpiece, as a result of which a non-cutting portion is provided. This is advantageous with regard to positional stabilizing of the cutting insert in relation to the workpiece and with regard to chip forming.

As claimed in a further development a lateral direction extends parallel to the main extension plane of the supporting surface and along a main extension direction of the center cutting edge and the lateral spacing d between the center cutting edge and the adjacent secondary cutting edges lies along said lateral direction in each case within the following range: 0.04 mm≤d≤1.3 mm. In particular, it lies within the range of 0.13 mm≤d≤0.8 mm. Said lateral spacing d at the same time corresponds to the lateral extension length of the respective transition edge. As claimed in a further development, the lateral extension length of the transition face, which connects to the transition edge in the depth direction, also lies within the range of between 0.04 mm and 1.3 mm, in particular within the narrower range of between 0.13 mm and 0.8 mm. As claimed in a further development, the offset h between the two secondary cutting edges and the center cutting edge lies along the height direction in each case within the following range: 1.2 mm≤h≤3.5 mm. In particular it lies within the range of 1.5 mm≤h≤3.0 mm. Said offset h along the height direction at the same time corresponds to the height of the respective transition edge. As claimed in a further development, the offset between the two secondary cutting faces, which connect to the secondary cutting edges in the depth direction, and the center cutting face, which connects to the center cutting edge in the depth direction, also lies in each case within the range of between 1.2 mm and 3.5 mm, in particular within the range of between 1.5 mm and 3.0 mm. Said broader and in particular the narrower range of the lateral spacing and of the offset along the height direction have proved to be particularly preferred with regard to positional stabilizing of the cutting insert in relation to the workpiece and with regard to chip forming.

In principle, the center cutting edge, the two secondary cutting edges and the two transition edges can in each case have a curved development. In principle, the center rake face connecting to the edges in the depth direction, the secondary rake faces and the transition faces and/or the center flank face connecting to the edges in the height direction, the secondary flank faces and the transition flank faces can in each case also have a curved development. In this case it is preferred that the named edges in each case are realized in a substantially rectilinear manner and the named faces in each case are realized in a substantially even manner (apart from roundings, phases etc. to be provided where applicable). As claimed in a further development, the center cutting edge and the two secondary cutting edges are in each case realized in a rectilinear manner. As claimed in a further development, the two transition edges are in each case realized in a substantially rectilinear manner. In this case, the edges (center cutting edge, secondary cutting edges and transition edges) are in particular realized in each case in a precisely rectilinear manner. In this case, they can be rounded in each case in their edge regions which form the transitions between the center cutting edge and the transition edges as well as the transitions between the transition edges and the secondary cutting edges. In this case, the transition edges, in particular in their rectilinear region which extends where applicable over their entire extension length, have an inclination n within the range of 2°≤n≤20°, in particular within the range of 5°≤n≤15° in relation to the height direction.

As claimed in a further development, a center rake face which connects to the center cutting edge (in the depth direction), two transition faces which connect to the two transition edges (in the depth direction) and/or two secondary rake faces which connect to the two secondary cutting edges (in the depth direction) is/are realized in each case in a substantially even manner. In particular, they are realized in a precisely even manner in each case. In this case, they can each be rounded in their edge regions which form the transitions between the center rake face and the transition faces as well as the transitions between the transition faces and the secondary rake faces.

In principle, the secondary cutting edges (or where applicable the main extension directions thereof) can be inclined with respect to the center cutting edge (or where applicable to the main extension direction thereof). In this case it is preferred that the inclination between the secondary cutting edges (or where applicable the main extension directions thereof) in relation to the center cutting edge (or where applicable to the main extension direction thereof) is ≤30°. The present invention can be realized, generally speaking, with different length ratios between the extension length of the center cutting edge and the extension length of the secondary cutting edges. Different overall lengths of all the cutting edges and edges (center cutting edge, two transition edges, two secondary cutting edges, where applicable further secondary cutting edges and/or transition edges, etc.) of the cutting edge along the lateral direction are also possible. In particular, the overall length lies within the range of between 16 mm and 60 mm. In addition, the present invention can be realized independently of whether a positive or negative flank angle (angle between the flank face and the height direction) is provided at the flank faces (center flank face, transition flank faces and secondary flank faces) which connect to the cutting edges or edges (center cutting edge, transition edges and secondary cutting edges) in the height direction. In use correspondingly different set angles of the cutting edge of the cutting insert in relation to the workpiece to be processed can be set. In addition, it can also be provided, in principle, that in each case different rake angles (angle between the rake face and the supporting surface), different flank angles and/or different wedge angles (angle between the rake face and the flank face) can be realized at the center cutting edge and at the secondary cutting edges. However, it is preferred for the rake angle, flank angle and wedge angle to be identical or at least to have similar values in the case of the center cutting edge and in the case of the secondary cutting edges.

The present invention additionally relates to a method for processing a workpiece by means of groove turning using a cutting insert with a cutting edge. The cutting edge, in this case, has one center cutting edge, two secondary cutting edges which are realized on both sides of and at a lateral spacing from the center cutting edge and are offset in relation to the center cutting edge, and two transition edges which connect the center cutting edge in each case to the adjacent secondary cutting edge.

The method has the following steps:
A) rotate the workpiece to be processed; and
B) infeed the cutting insert into the rotating workpiece to be processed with an alignment such that the center cutting edge is aligned in the contact region of the cutting edge with the workpiece substantially at right angles to a direction of movement of the material of the workpiece and that the transition edges, in a non-edge-overlapping region, over a portion have an inclination in the contact region of the edge with the workpiece within a range of between (inclusive) 2° and 20° (inclusive) in relation to said direction of movement of the material of the workpiece.

In the case of the method as claimed in the invention, the further developments and variants explained above with reference to the cutting insert as claimed in the invention can be realized in a corresponding manner. In this case, the advantages explained above are obtained in a substantial manner. In particular, the inclination of the transition edges over the portion lies within a range of between 5° (inclusive) and 15° (inclusive) in relation to the direction of movement of the material. An alignment of the center cutting edge which is "substantially at right angles" in relation to a direction of movement of the material of the workpiece refers in particular to an angular range of ±30° in relation to a precisely perpendicular alignment. The cutting edges (center cutting edge, secondary cutting edges) of the cutting edge are aligned in the contact region of the cutting edge with the workpiece in particular substantially parallel to the surface of the workpiece to be processed.

BRIEF DESCRIPTION OF THE SEVERAL VIEWS OF THE DRAWING

Further advantages and expediencies of the invention are produced by way of the following description of exemplary embodiments with reference to the accompanying figures, in which.

DESCRIPTION OF THE INVENTION

The design of a cutting insert -2- as claimed in the invention is explained below with reference to FIGS. 1-4, as claimed in one embodiment of the present invention. The cutting insert -2- forms a heavy machine cutting groove plate for the heavy machine cutting groove turning of metal workpieces. The cutting insert -2- has an even, bottom supporting surface -4- which extends along a lateral direction -S- and a depth direction -T-. A height direction -H- stands at right angles along the plane formed by the bottom supporting surface -4- (i.e. at right angles along the lateral direction -S- and the depth direction -T-). The cutting insert -2- has a cutting edge -6-, the main extension direction of which extends parallel to the lateral direction -S-. The cutting edge -6- is realized on an edge of the cutting insert body -8- between a lateral face -10- and a top face -12- of the same, the top face -12- being arranged opposite the bottom supporting surface -4-. The cutting insert body -8- also has a through fastening hole -13- which serves for fastening the cutting insert -2- in a receiving means (not shown) of a tool holder by means of a screw or by means of a journal.

In the case of the embodiment shown, the cutting edges of the cutting edge -6- are formed by one (single) center cutting edge -14- and by (precisely) two secondary cutting edges -16-, -18-. The two secondary cutting edges -16-, -18- are arranged with reference to the lateral direction -S- on both sides of the center cutting edge -14- and at a lateral spacing from the same. In addition, they are offset with respect to the center cutting edge -14- in the height direction -H- in such a manner that the center cutting edge -14- protrudes further upward in relation to the bottom supporting surface -4- (i.e. in the height direction) than the secondary cutting edges -16-, -18-. In each case one transition edge -20-, -22- is provided between the center cutting edge -14- and the secondary cutting edges -16-, -18-. The transition edges -20-, -22- in each case connect the center cutting edge -14- to the secondary cutting edges -16-, -18-. The center cutting edge -14- and the secondary cutting edges -16-, -18-, apart from their respective edge regions on each of which a rounding to the transition to the transition edges -20-, -22- is provided, are realized in a linear manner. They extend parallel to one another and along the lateral direction -S-. The transition edges -20-, -22-, apart from their edge regions on both sides, are also realized in a linear manner in each case. Roundings to the transition to the center cutting edge -14- and to the transition to the respective secondary cutting edge -16- or -18- are provided once again on their edge regions (cf. in particular the enlarged representation of the detail in FIG. 2).

Figure 3A:
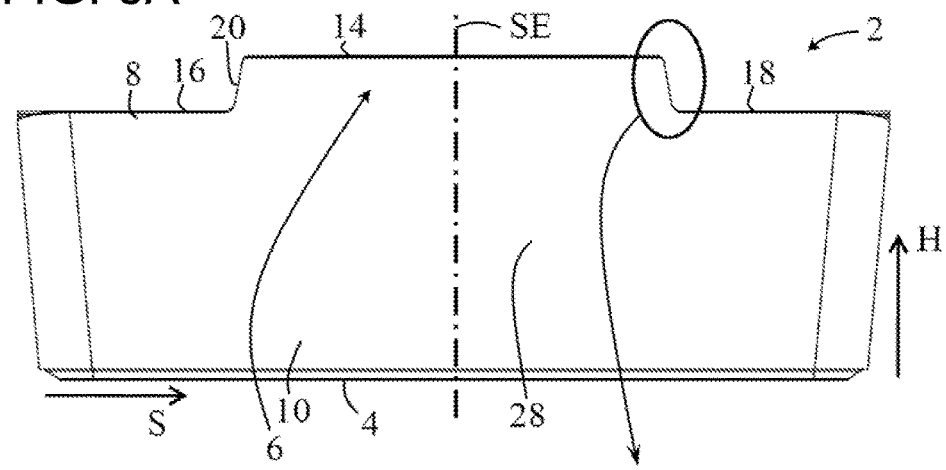
FIG. 3A: shows a view of the cutting insert from FIG. 1 from the front.
Figure 3B:
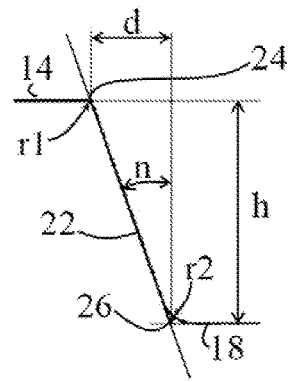
FIG. 3B: shows an enlarged representation of a detail from FIG. 3A.

The edge development from the center cutting edge -14- via the transition edge -22- to the secondary cutting edge -18- can be seen in particular by way of the front view (along the depth direction -T-) in FIG. 3A and in particular by way of the enlarged representation in FIG. 3B. The center cutting edge -14- and the transition edge -22- in each case extend in a linear manner in the transition -24- thereof, the transition -24- in the present case having a radius of curvature -r1- of 0.2 mm. Said transition -24- is relevant in particular with regard to chip separation and correspondingly has a relatively small radius of curvature. The transition edge -22- and the secondary cutting edge -18- extend once again in a linear manner in the transition thereof -26-, the transition -26- in the present case having a radius of curvature -r2- of 0.5 mm. In the case of the embodiment shown, the offset between the secondary cutting edges -16-, 18- and the center cutting edge -14- is formed exclusively in the height direction -H-, said offset -h- in the height direction being 2.5 mm in the present case. In addition, the linear portion of the transition edge -22- is inclined in the present case at an inclination -n- of 10° in relation to the height direction -H-. Correspondingly, the transition edge -22- is non-cutting substantially over its entire, lateral extension length -d- (apart from the edge regions which are provided with a rounding) as a result of its relatively small inclination with respect to the height direction -H-. The lateral extension length -d-, in this case, corresponds to the lateral spacing -d- between the center cutting edge -14- and the adjacent secondary cutting edge -18- along the lateral direction -S-.

Figure 1:
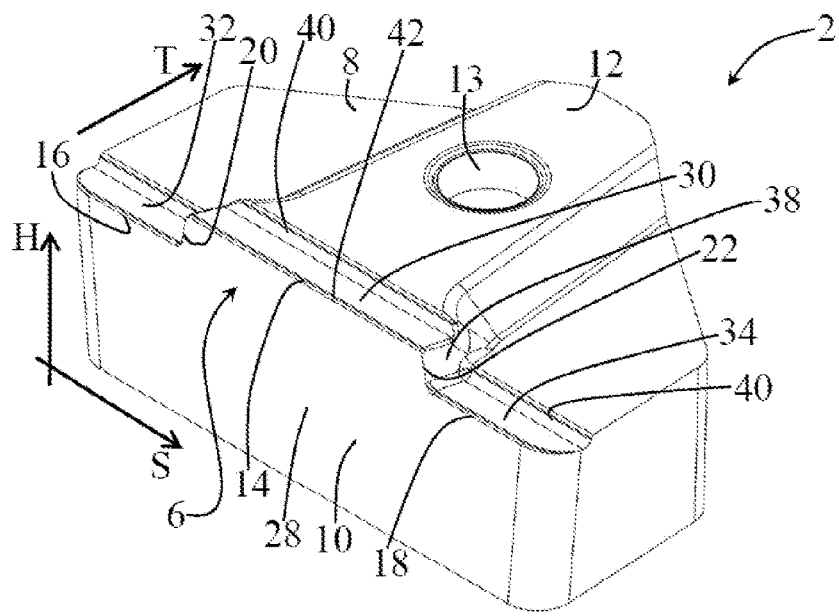
FIG. 1: shows a perspective view of a cutting insert as claimed in one embodiment of the invention.
Figure 2:
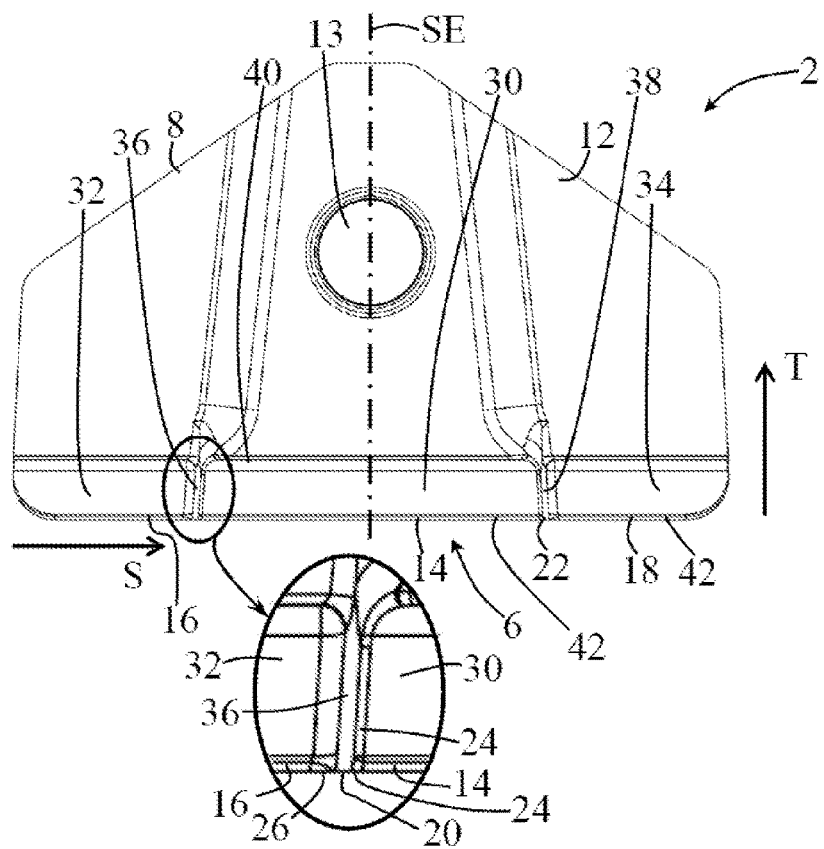
FIG. 2: shows a top view of the cutting insert from FIG. 1 from above.
Figure 4:
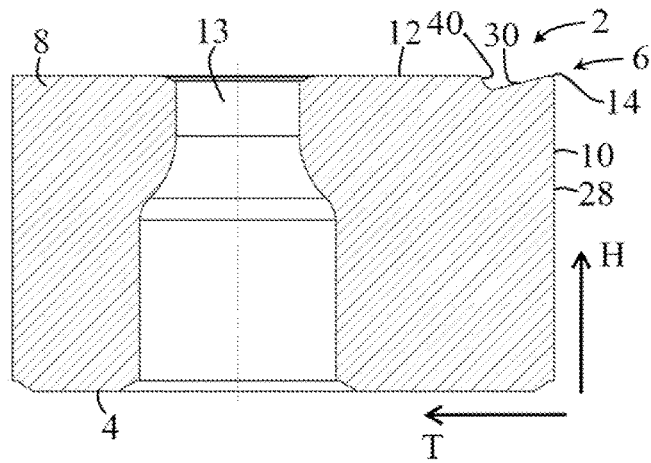
FIG. 4: shows a cross sectional view of the cutting insert from FIG. 1.

As can be seen in particular by way of FIGS. 2 and 3A, the cutting insert -2- and in particular the edge development of the center cutting edge -14-, of the two transition edges -20-, -22- and of the two secondary cutting edges -16-, -18- is realized in a mirror-symmetrical manner with respect to a plane of symmetry -SE-. In addition, the edge development is realized continuously non-edge-overlapping. The plane of symmetry -SE-, in this case, extends at right angles to an extension direction of the center cutting edge -14- (extending in a rectilinear manner) and intersects the center cutting edge -14- in the middle thereof. The plane of symmetry -SE-, in the present case, is spanned by the height direction -H- and the depth direction -T-. FIG. 4 shows a cross sectional view of the cutting insert -2- along the plane of symmetry -SE-. In the case of the present embodiment, the flank face -28-, which connects to the edges (center cutting edge -14-, transition edges -20-, -22- and secondary cutting edges -16-, -18-) in the height direction and is formed by the lateral face -10- of the cutting insert body -8-, extends continuously at an angle of 90° with respect to the bottom supporting surface -4-. Correspondingly, no flank angle is provided in the case of the present embodiment. In use, the cutting insert -2- is set at a corresponding cutting edge set angle, for example of 6°. In the depth direction -T- a center rake face -30- connects to the center cutting edge -14-, secondary rake faces -32-, -34- connect in each case to the secondary cutting edges -16-, -18- and transition faces -36-, -38-, along which the chips are guided in use, connect to the transition edges -20-, -22-. The center rake face -30- and the secondary rake faces -32-, -34- decline slightly in height along the depth direction -T- (cf. FIGS. 1 and 4) until in each case they merge into a chip back -40- which serves for chip guiding and chip breaking. Apart from respective roundings in the transition regions, the center rake face -30-, the secondary rake faces -32-, -34- and the transition faces -36-, -38- are realized in each case as even faces which in their development substantially follow the above-described edge development of the center cutting edge -14-, the two secondary cutting edges -16-, -18- and the two transition edges -20-, -22-. The size of the chip angle and of the wedge angle in the region of the center cutting edge -14- is substantially the same as in the region of the secondary cutting edges -16-, -18-. As can be seen by way of FIGS. 1, 2 and 4, the center cutting edge -14- and the two secondary cutting edges -16-, -18- are provided in each case with a phase -42-.

In the case of the embodiment shown in FIGS. 1 to 4, the center cutting edge -14- is offset upward (exclusively) in the height direction -H- with respect to the secondary cutting edges -16-, -18-. Compared with this, other edge developments are also possible, as is explained below by way of a few examples with reference to FIGS. 5A to 5D. In this case, FIGS. 5A to 5D show schematic representations of different edge developments of one center cutting edge and two or more secondary cutting edges and transition edges. In this case, details of the differences compared to the first embodiment explained with reference to FIGS. 1 to 4 are predominantly given. In the case of FIGS. 5A to 5D, the offset between the center cutting edge and the secondary cutting edges can extend in the height direction and, where applicable, also in the depth direction, the offset preferably extending to at least 80% along the height direction. The inclination of the transition edges lies in each case within a range of between 2° and 20° in relation to the height direction. The edge developments shown in FIGS. 5A to 5D are realized in a continuously mirror-symmetrical manner with respect to the plane of symmetry -SE- which, once again, extends at right angles to the extension direction of the center cutting edge and intersects the same in the middle.

Figure 5A:
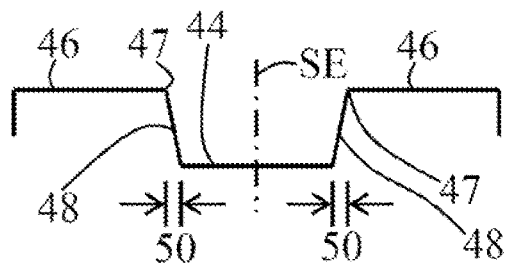
FIG. 5A-5D: show a schematic representation of edge developments of the center cutting edge, of the transition edges and of the secondary cutting edges as claimed in different embodiments of the invention.

In the case of the edge development shown in FIG. 5A, the center cutting edge -44- is set back in relation to the secondary cutting edges -46- (in the height direction and where applicable also in the depth direction). In the case of said embodiment, with regard to effective chip separation, in particular the transitions -47- between the secondary cutting edges -46- and the transition edges -48- adjoining in each case are to be provided with a relatively small radius of curvature, in particular with a radius of curvature of 0.3 mm.

The transition edges in FIGS. 5A to 5D extend in each case in a linear manner and have continuously an inclination of 10° in relation to the height direction. They correspondingly form substantially over their entire lateral extension length (apart from roundings provided where applicable on their edge regions) in each case a non-cutting portion -50-. Said non-cutting portions -50- are shown schematically in each case in FIGS. 5A to 5D. Apart from said non-cutting portions -50-, the edge development in the case of the different embodiments is realized in each case in a cutting manner over its entire lateral extension length.

Figure 5B:
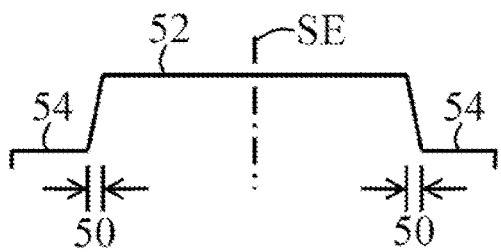

In FIG. 5B the lateral extension length of the center cutting edge -52- is clearly longer than the lateral extension length of the secondary cutting edges -54-. Furthermore, the edge development corresponds extensively to the edge development explained with reference to FIGS. 1 to 4.

Figure 5C:
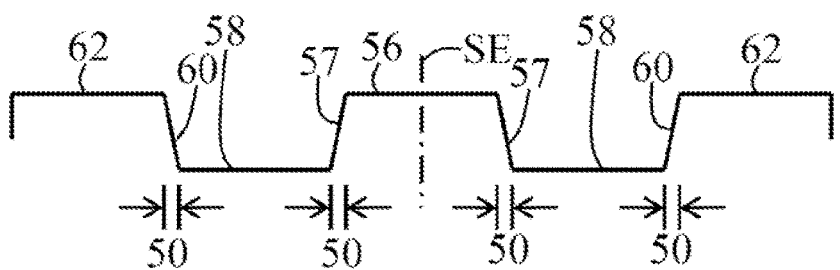

In FIG. 5C the edge development of the center cutting edge -56-, of the secondary cutting edges -58- provided on both sides thereof and of the connecting transitions edges -57- corresponds extensively to the edge development explained with reference to FIGS. 1 to 4. Further transition edges -60-, which in each case connect the secondary cutting edges -58- to further secondary cutting edges -62-, connect on both sides to the secondary cutting edges -58-. The further secondary cutting edges -62-, in this case, are arranged spaced laterally from the secondary cutting edges -58- and are vertically offset and where applicable also offset in depth with respect to the secondary cutting edges -58-. The further secondary cutting edges -62-, with reference to the height direction and the depth direction, have the identical position as the center cutting edge -56-. In the case of said embodiment, the two transition edges -57- and the two further transition edges -60- have in each case non-cutting portions -50- over their entire lateral extension length (apart from roundings provided where applicable on their edge regions).

Figure 5D:
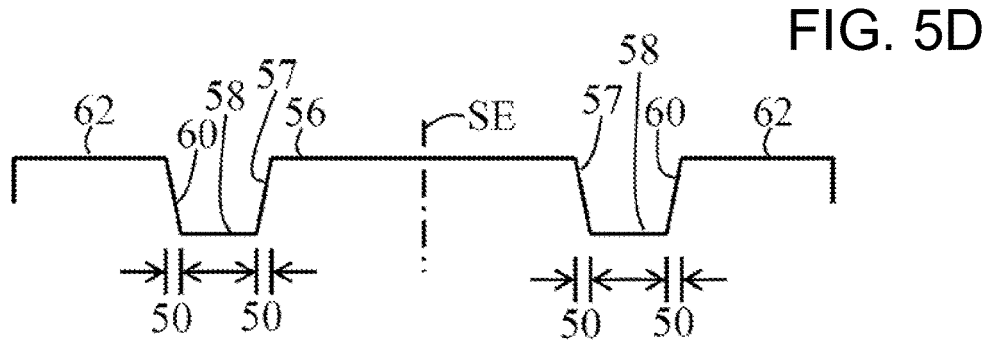

In FIG. 5D the edge development corresponds extensively to the edge development shown in FIG. 5C, the identical references being used once again. In contrast to FIG. 5C, the lateral extension length of the center cutting edge -56- is clearly longer than the lateral extension length of the adjacent secondary cutting edges -58-.

The present invention is not restricted to the exemplary embodiments explained with reference to the figures. In particular, other developments of the transition edges are also possible. In particular, it can also be provided that in the case of at least one part region of the lateral extension length of the transition edges an edge overlap occurs and/or the inclination is inclined relatively strongly with respect to the height direction (in particular in excess of 20°), whilst a further part region of the lateral extension length is non-edge-overlapping and at least over a portion has a relatively small inclination (in particular less than 20°) in relation to the height direction. In addition, other developments of the center cutting edge and of the secondary cutting edges, in particular curved developments, are possible.

The invention claimed is:
1. A groove turning cutting insert comprising:
   a bottom supporting surface;
   a center cutting edge;
   two secondary cutting edges respectively formed laterally of said center cutting edge, offset from said center cutting edge by a height offset, and laterally spaced apart from said center cutting edge by a non-cutting portion; and two transition edges respectively connecting said center cutting edge to the respective said secondary cutting edges adjacent said center cutting edge, said transition edges, in each case in a non-edge-overlapping region, having an inclination n at least over a portion thereof, where $2° \leq n \leq 20°$ in relation to a height direction that extends at right angles with respect to a main extension plane of said bottom supporting surface.

2. The cutting insert according to claim 1, wherein said secondary cutting edges are also offset from said center cutting edge by a depth offset.

3. The cutting insert according to claim 1, wherein said transition edges, in each case in a non-edge-overlapping region, have at least over a portion thereof, an inclination n where $5° \leq n \leq 15°$ in relation to the height direction.

4. The cutting insert according to claim 1, wherein an edge development of said center cutting edge, of said two transition edges and of said two secondary cutting edges is substantially mirror-symmetrical in relation to a plane of symmetry that extends parallel to the height direction and orthogonally to a main extension direction of said center cutting edge.

5. The cutting insert according to claim 1, wherein an edge development of said center cutting edge, said two transition edges, and said two secondary cutting edges is implemented continuously non-edge-overlapping.

6. The cutting insert according to claim 1, wherein transitions formed between said center cutting edge and said transition edges and/or transitions between said transition edges and said secondary cutting edges each have a radius of curvature less or equal 0.3 mm.

7. The cutting insert according to claim 1, wherein said center cutting edge projects farther forward in relation to said supporting surface than said two secondary cutting edges.

8. The cutting insert according to claim 1, wherein an offset between said two secondary cutting edges and said center cutting edge is formed in each case to be at least 80% along the height direction.

9. The cutting insert according to claim 1, wherein:
a lateral direction is defined parallel to the main extension plane of said supporting surface and along a main extension direction of said center cutting edge; and
a lateral spacing d between said center cutting edge and said adjacent secondary cutting edges along said lateral direction in each case lies within the following range:

$0.04$ mm$\leq d \leq 1.3$ mm.

10. The cutting insert according to claim 1, wherein the height offset h between said two secondary cutting edges and said center cutting edge along the height direction in each case lies within the following range 1.2 mm$\leq h \leq 3.5$ mm.

11. The cutting insert according to claim 1, wherein said center cutting edge and said two secondary cutting edges are substantially rectilinear cutting edges.

12. The cutting insert according to claim 1, wherein said two transition edges are substantially rectilinear.

13. The cutting insert according to claim 1, wherein at least one of the faces selected from the group consisting of:
one center rake face connecting to said center cutting edge;
two transition faces respectively connecting to said two transition edges; and two secondary rake faces connecting to said two secondary cutting edges;
is/are formed as a planar face or faces.

14. A method of processing a workpiece by way of groove turning, the method comprising:
providing a groove-turning cutting insert with a discontinuous cutting edge having a center cutting edge, two secondary cutting edges straddling said center cutting edge, the secondary cutting edges being laterally spaced from the center cutting edge by a non-cutting portion and offset in relation to the center cutting edge, and two transition edges that connect the center cutting edge in each case to the adjacent secondary cutting edge;
rotating the workpiece to be processed; and
infeeding the cutting insert into the rotating workpiece with the center cutting edge aligned in a contact region of the cutting edge with the workpiece substantially at right angles to a direction of movement of a material of the workpiece, and with the transition edges, in a non-edge-overlapping region, over a portion having an inclination in a contact region of the edge with the workpiece lying within a range of between 2° and 20° in relation to the direction of movement of the material of the workpiece.

15. A cutting insert comprising:
a bottom supporting surface;
a center cutting edge;
two secondary cutting edges respectively formed laterally of said center cutting edge, offset from said center cutting edge by a height offset, and laterally spaced apart from said center cutting edge;
said center cutting edge projecting farther forward in relation to said supporting surface than said two secondary cutting edges; and
two transition edges respectively connecting said center cutting edge to the respective said secondary cutting edges adjacent said center cutting edge, said transition edges, in each case in a non-edge-overlapping region, having an inclination n at least over a portion thereof, where $2° \leq n \leq 20°$ in relation to a height direction that extends at right angles with respect to a main extension plane of said bottom supporting surface.

16. A groove turning cutting insert comprising:
a bottom supporting surface;
a center cutting edge;
two secondary cutting edges respectively formed laterally of said center cutting edge, offset from said center cutting edge by a height offset and by a depth offset, and laterally spaced apart from said center cutting edge; and
two transition edges respectively connecting said center cutting edge to the respective said secondary cutting edges adjacent said center cutting edge, said transition edges, in each case in a non-edge-overlapping region, having an inclination n at least over a portion thereof, where $2° \leq n \leq 20°$ in relation to a height direction that extends at right angles with respect to a main extension plane of said bottom supporting surface.

17. A groove turning cutting insert comprising:
a bottom supporting surface;
a center cutting edge;
two secondary cutting edges respectively formed laterally of said center cutting edge, offset from said center cutting edge by a height offset, and laterally spaced apart from said center cutting edge; and two transition edges respectively connecting said center cutting edge to the respective said secondary cutting edges adjacent said center cutting edge, said transition edges, in each case in a non-edge-overlapping region, having an inclination n at least over a portion thereof, where $2° \leq n \leq 20°$ in relation to a height direction that extends at right angles with respect to a main extension plane of said bottom supporting surface;

wherein at least one of the faces selected from the group consisting of:
- one center rake face connecting to said center cutting edge;
- two transition faces respectively connecting to said two transition edges; and
- two secondary rake faces connecting to said two secondary cutting edges;

is/are formed as a planar face or faces.

* * * * *